United States Patent
Nagaoka et al.

(10) Patent No.: US 7,489,805 B2
(45) Date of Patent: Feb. 10, 2009

(54) VEHICLE SURROUNDINGS MONITORING APPARATUS

(75) Inventors: Nobuharu Nagaoka, Nasukarasuyama (JP); Masakazu Saka, Utsunomiya (JP); Hideki Hashimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 624 days.

(21) Appl. No.: 11/287,750

(22) Filed: Nov. 28, 2005

(65) Prior Publication Data

US 2006/0115119 A1  Jun. 1, 2006

(30) Foreign Application Priority Data

Nov. 30, 2004  (JP) .............................. 2004-347818

(51) Int. Cl.
  *G06K 9/00* (2006.01)
  *B60Q 1/00* (2006.01)
(52) U.S. Cl. ...................................... 382/104; 340/435
(58) Field of Classification Search ................. 382/103, 382/104, 106, 190, 209; 348/113, 148, 149; 340/3.1, 3.6, 435, 573.3, 901–904, 932, 933, 340/935, 938, 988, 991, 995.17; 701/1, 49, 701/53, 300
See application file for complete search history.

(56) References Cited

U.S. PATENT DOCUMENTS

| | | | |
|---|---|---|---|
| 6,327,536 B1 * | 12/2001 | Tsuji et al. | 701/301 |
| 6,531,959 B1 * | 3/2003 | Nagaoka et al. | 340/435 |
| 7,130,448 B2 | 10/2006 | Nagaoka et al. | |
| 7,141,796 B2 * | 11/2006 | Hattori et al. | 250/370.08 |
| 2001/0002936 A1 | 6/2001 | Tsuji et al. | |
| 2003/0007074 A1 | 1/2003 | Kaisha | |
| 2003/0137593 A1 | 7/2003 | Watanabe et al. | |
| 2004/0183906 A1 | 9/2004 | Nagaoka et al. | |
| 2005/0063565 A1 | 3/2005 | Nagaoka et al. | |
| 2005/0276447 A1 | 12/2005 | Taniguchi et al. | |
| 2005/0276450 A1 | 12/2005 | Taniguchi et al. | |

FOREIGN PATENT DOCUMENTS

| | | |
|---|---|---|
| DE | 100 33 599 A1 | 2/2001 |
| DE | 102 28 638 A1 | 1/2003 |
| DE | 102 47 371 A1 | 7/2003 |
| DE | 103 01 469 A1 | 9/2003 |

(Continued)

*Primary Examiner*—Abolfazl Tabatabai
(74) *Attorney, Agent, or Firm*—Carrier, Blackman & Associates, P.C.; Joseph P. Carrier; William D. Blackman (57) ABSTRACT

A vehicle surroundings monitoring apparatus that extracts a body present in the surroundings of a vehicle as an object, based on an image captured by an infrared imaging device including a binarized object extraction device that extracts a binarized object from image data obtained by binarizing a gray scale image of the image, an obstacle determination device that determines whether or not another body being an obstacle is present between the infrared imaging device and the binarized object, a height calculation device that calculates a height dimension of the binarized object based on the height dimension of the obstacle on the gray scale image when it is determined that an obstacle is present in a determination result of the obstacle determination device and an object type determination device that determines a type of the object based on the height dimension of the binarized object.

5 Claims, 9 Drawing Sheets

FOREIGN PATENT DOCUMENTS

| | | |
|---|---|---|
| DE | 103 01 468 A 1 | 10/2003 |
| DE | 10 2004 012 811 A1 | 11/2004 |
| DE | 10 2004 041 919 A1 | 4/2005 |
| DE | 10 2005 026 875 A1 | 1/2006 |
| DE | 10 2005 026 876 A1 | 6/2006 |
| EP | 1 245 443 A 2 | 10/2002 |
| JP | 8-313632 | 11/1996 |
| JP | 11-328364 | 11/1999 |
| JP | 2000-030197 | 1/2000 |
| JP | 2001-6096 | 1/2001 |
| JP | 2001-211449 | 8/2001 |
| JP | 2001-351200 | 12/2001 |
| JP | 2003-216937 | 7/2003 |

\* cited by examiner

VEHICLE SURROUNDINGS MONITORING APPARATUS

BACKGROUND OF THE INVENTION

1. Field of the Invention

The present invention relates to a vehicle surroundings monitoring apparatus that extracts objects by performing binarization processing of images taken by infrared cameras.

Priority is claimed on Japanese Patent Application No. 2004-347818, filed Nov. 30, 2004, the content of which is incorporated herein by reference.

2. Description of Related Art

Conventionally, a display processing device is known in which an object such as a pedestrian with a possibility of colliding with a vehicle is extracted from an infrared image of a vehicles surroundings captured by an infrared camera, and information of this object is provided to the driver (for example, see Japanese Unexamined Patent Application, First Publication No. H11-328364).

This display processing device searches a region (binarized object) where bright parts are concentrated by binarizing the infrared image, and determines whether or not the binarized object is a pedestrian's head based on the distance calculated from an aspect ratio or filling factor of the binarized object, and also an actual area and a enter of gravity on the infrared image. Then, the height of the pedestrian on the infrared image is calculated from the distance between the head part region of the pedestrian and the infrared camera, and an average height of adult persons, and a body region containing the body of a pedestrian is set. By separating and displaying the head region and body region from other regions, visual aid for the driver is performed with respect to a pedestrian.

Moreover, a technique is known which searches a region (binarized object) where bright parts are concentrated by binarizing the infrared image, extracts the image region at the same distance from that of the binarized object in the vertical direction of the binarized object from the binarized object and the image region to recognize that the object is a pedestrian (for example, see Japanese Unexamined Patent Application, First Publication No. 2003-216937).

Incidentally, since the display processing device of the example of the related art mentioned above detects a pedestrian based on determination of the shape for a head part region or body part region on the infrared image, it may become difficult to distinguish a pedestrian from a manmade structure that has a shape of a pedestrian, and particularly a similar shape, size, and position height of the pedestrian's head and that emits heat.

Moreover, in Japanese Unexamined Patent Application, First Publication No. 2003-216937, the pedestrian recognition is simply performed by calculating the height of the object based on the binarized object and the image region at the same distance as that of the binarized object in the vertical direction of the binarized object, on the infrared image. Therefore, if an obstacle is present forward of the binarized object, the region at the same distance as that of the binarized object can not be detected downward of the binarized object, and it may become difficult to detect the actual height of the object accurately. Therefore it may become difficult to distinguish a pedestrian.

SUMMARY OF THE INVENTION

The present invention takes into consideration the above-mentioned circumstances, with an object of providing a vehicle surroundings monitoring apparatus that is capable of precisely distinguishing and extracting a pedestrian and a manmade structure on an infrared image.

In order to solve the above problem and achieve the related object, the present invention provides a vehicle surroundings monitoring apparatus that extracts a body present in the surroundings of a vehicle as an object, based on an image captured by an infrared imaging device including a binarized object extraction device that extracts a binarized objects from image data obtained by binarizing a gray scale image of the image; an obstacle determination device that determines whether or not another body being an obstacle is present between the infrared imaging device and the binarized object extracted by the binarized object extraction device; a height calculation device that calculates a height dimension of the binarized object based on the height dimension of the obstacle on the gray scale image when it is determined that an obstacle is present in a determination result of the obstacle determination device; and an object type determination device that determines a type of the object based on the height dimension of the binarized object calculated by the height calculation device.

According to the vehicle surroundings monitoring apparatus mentioned above, even in a case where, due to the presence of an obstacle between the infrared imaging device and the binarized object, the bottom end of the binarized object can not be directly detected so that the height dimension of the binarized object may be misdetected, the occurrence of the misdetection of the height dimension of the binarized object can be avoided by calculating the height dimension of the binarized object based on the height dimension of the continually on the binarized object; a height calculation device that sets a value obtained by adding the height corresponding to the distance from the bottom end of the binarized object extracted by the binarized object extraction device to the bottom end of the second search region which is positioned at the most bottom among the second search regions determined to be disposed continually on the binarized object by the continuity determination device, to the vertical width of the binarized object, as the height dimension of the binarized object; and an object type determination device that determines the type of the object based on the height dimension of the binarized object calculated by the height calculation device.

According to the vehicle surroundings monitoring apparatus mentioned above, even in a case where a relatively large body (for example such as a wall) is present between the infrared imaging device and the binarized object, and the binarized object is present projecting upward from the top end of this body in an image captured by an infrared imaging device, the height dimension of this body can be detected accurately. Furthermore, the occurrence of misdetection of the height dimension of the binarized object can be avoided by calculating the height dimension of the binarized object based on the height dimension of this body. That is, by determining whether or not the series of section search regions that are disposed to be vertically adjacent to the binarized object are present, by the continuity determination device, the height dimension of the body which is present forward of the binarized object can be accurately detected. Furthermore, the height calculation device estimates the height dimension of the part of the binarized object shielded by the body based on the height dimension of the body in the gray scale image, the distance from the infrared imaging device to the body, and the distance from the infrared imaging device to the binarized object, and newly sets a value obtained by adding this estimated height dimension and the directly detected height obstacle in the gray scale image. For example, the height calculation device estimates the height dimension of the part of the binarized object shielded by the obstacle based on the height dimension of the obstacle in the gray scale image, the distance from the infrared imaging device to the obstacle, and the distance from the infrared imaging device to the binarized object, and newly sets a value obtained by adding this estimated height dimension and the directly detected height dimension of the binarized object, as the height dimension of the binarized object. Accordingly, the accuracy of the height dimension of the binarized object can be improved, and the type of the binarized object can be accurately determined.

Furthermore, the present invention provides a vehicle surroundings monitoring apparatus that extracts a body present in the surroundings of a vehicle as an object, based on an image captured by an infrared imaging device which including a binarized object extraction device that extracts a binarized object from image data obtained by binarizing a gray scale image of the image; a first search region setting device that sets a plurality of first search regions having a predetermined height width downward of the binarized object extracted by the binarized object extraction device, and adjacent to each other, in the gray scale image; a second search region setting device that compares a binarized object distance which is a status quantity in relation to a distance between the binarized object extracted by the binarized object extraction device and the infrared imaging device, with a first search region distance which is a status quantity in relation to a distance between the respective plurality of first search regions set by the first search region setting device and the infrared imaging device, and newly sets the first search region corresponding to the first search region distance which is shorter than the binarized object distance, as a second search region; a continuity determination device that determines whether or not the second search regions set by the second search region setting device are disposed dimension of the binarized object, as the height dimension of the binarized object. Accordingly, the accuracy of the height dimension of the binarized object can be improved, and the type of the binarized object can be accurately determined.

The continuity determination device may determine that the binarized object or the second search regions which are present within a predetermined distance from appropriate second search regions are the continually disposed second search regions.

In this case, for example by setting the relatively short value as the predetermined distance (for example such as a distance to the extent of including the adjacent second search region), the adjacent second search region can be precisely extracted. Moreover, by setting the relatively long value as the predetermined distance (for example such as a distance to the extent of including at least a plurality of adjacent second search regions), even in the case where the extraction of the second search regions becomes locally impossible due to the detection errors and the like, it can be actually determined that the second search regions are continually disposed, and the height dimension of the body which is present forward of the binarized object can be accurately detected.

Furthermore, the vehicle surroundings monitoring apparatus of the present invention may further include a pedestrian recognition device that recognizes pedestrians present in the surroundings of a vehicle based on the image, the pedestrian recognition device executing pedestrian recognition processing on the object when the object is determined by the object type determining device to be something other than a manmade structure, or to be a pedestrian.

In this case, pedestrian recognition accuracy can be improved by performing the pedestrian recognition processing for the object determined to be something other than a manmade structure as well as for the object determined to be a pedestrian.

Furthermore, the vehicle surroundings monitoring apparatus of the present invention may further include a warning output device that outputs a warning directed to the object when the object is determined by the object type determination device to be something other than a manmade structure or to be a pedestrian.

In this case, since a warning can be output for an object determined to be something other than a manmade structure as well as an object determined to be a pedestrian, unnecessary warnings for a manmade structure can be avoided.

DETAILED DESCRIPTION OF THE INVENTION

Hereunder, a vehicle surroundings monitoring apparatus according to one embodiment of the present invention is described, with reference to the drawings.

Figure 1:
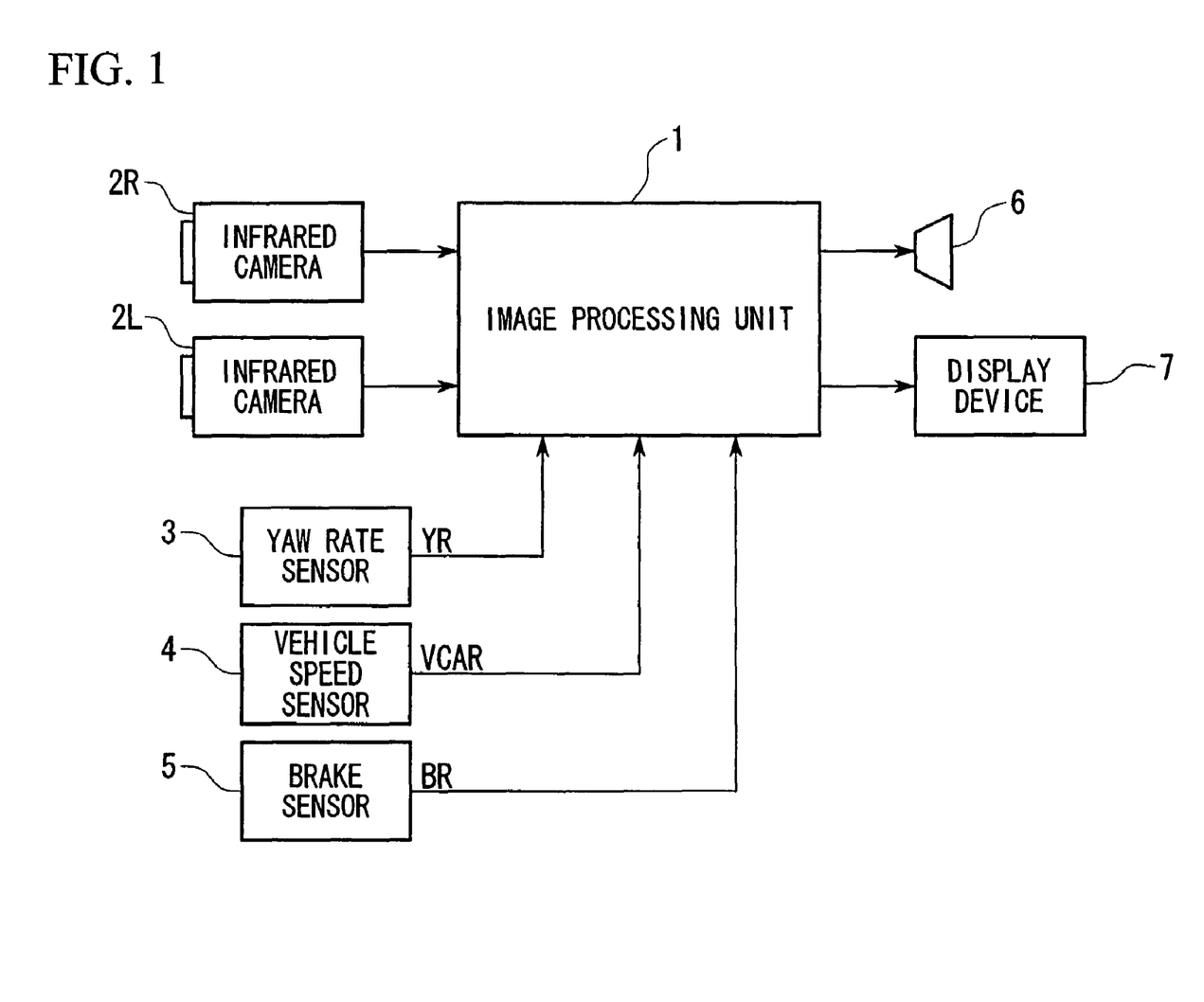
FIG. 1 is a block diagram showing the construction of a vehicle surroundings monitoring apparatus according to an embodiment of the present invention.

The vehicle surroundings monitoring apparatus according to the present embodiment, for example as shown in FIG. 1, including an image processing unit 1 equipped with a CPU (Central Processing Unit) that controls the vehicle surroundings monitoring apparatus; two infrared cameras 2R and 2L that are capable of detecting distant infrared radiation; a yaw rate sensor 3 that detects the yaw rate of the vehicle; a vehicle speed sensor 4 that detects the traveling speed of the vehicle; a brake sensor 5 that detects a driver's braking operation; a speaker 6; and a display device 7. For example, the image processing unit 1 detects a moving object such as a pedestrian or an animal in front of the vehicle in its traveling direction from infrared images of the surroundings of the vehicle that are captured by the two infrared cameras 2R and 2L, and from detection signals relating to the traveling status of the vehicle that are detected by each of the sensors 3, 4 and 5. In the case where the possibility of a collision between the detected moving object and the vehicle is determined, a warning is output via the speaker 6 or the display device 7.

Moreover, the display device 7 is, for example, constructed including a display device integrated with gauges that display various traveling states of the vehicle, a display device such as a navigation device, and furthermore an HUD (Head Up Display) 7a that displays various information at a position on the front window where the field of front vision of the driver is not impaired.

In addition, the image processing unit 1 includes an A/D converter, that converts input analog signals to digital signals, an image memory, that stores digitized image signals, a CPU (central processing unit), that performs various arithmetic processing, a RAM (Random Access Memory), that is used for storing data in the middle of the arithmetic processing, a ROM (Read Only Memory), that stores programs that are performed by the CPU, and tables, maps and the like, and an output circuit that outputs drive signals for the speaker 6 and display signals for the HUD 7a. The image-processing unit 1 is constructed such that the output signals of the infrared cameras 2R and 2L, and the respective sensors, 3, 4, and 5 are input into the CPU after being converted to digital signals.

Figure 2:
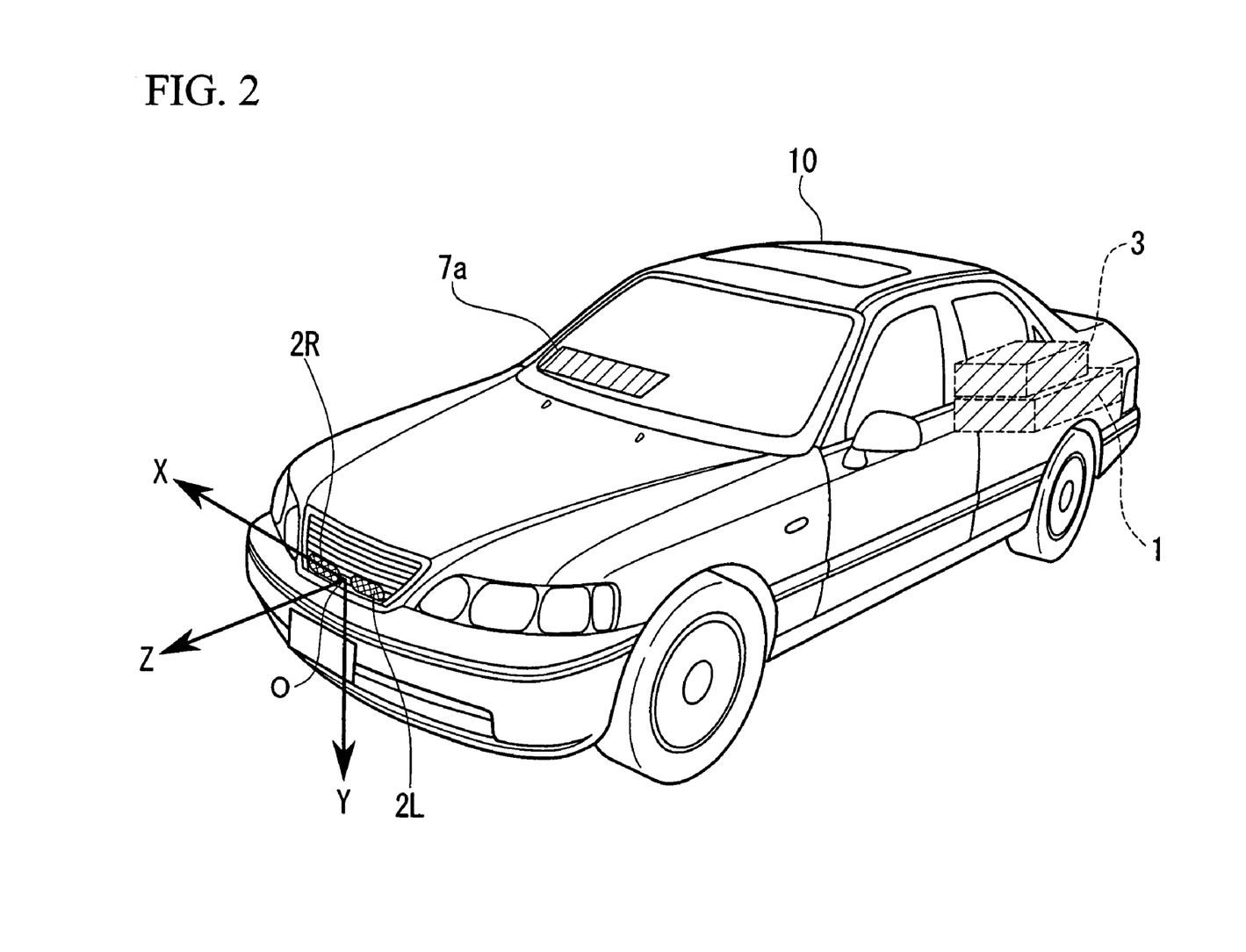
FIG. 2 is a diagram showing a vehicle equipped with the vehicle surroundings monitoring apparatus shown in FIG. 1.

Furthermore, as shown in FIG. 2, two infrared cameras 2R and 2L are disposed at the front of the vehicle 10 at positions symmetrical in the width direction relative to the central axis of the vehicle 10. The optical axes of both cameras 2R and 2L are parallel to each other, and both infrared cameras 2R and 2L are secured at the same height from the road surface. A characteristic of the infrared cameras 2R and 2L is that the output signal level (that is, luminance) increases as the temperature of the object increases.

Moreover, the HUD 7a is provided so as to display the images at a position on the front window of the vehicle 10, where the field of front vision of the driver is not impaired.

The vehicle surroundings monitoring apparatus according to the present embodiment is provided with the construction described above. Next, the operation of the vehicle surroundings monitoring apparatus is described, with reference to the drawings.

The operations in the image processing unit 1 for the detection of an object such as a pedestrian, and outputting a warning, are described below.

Figure 3:
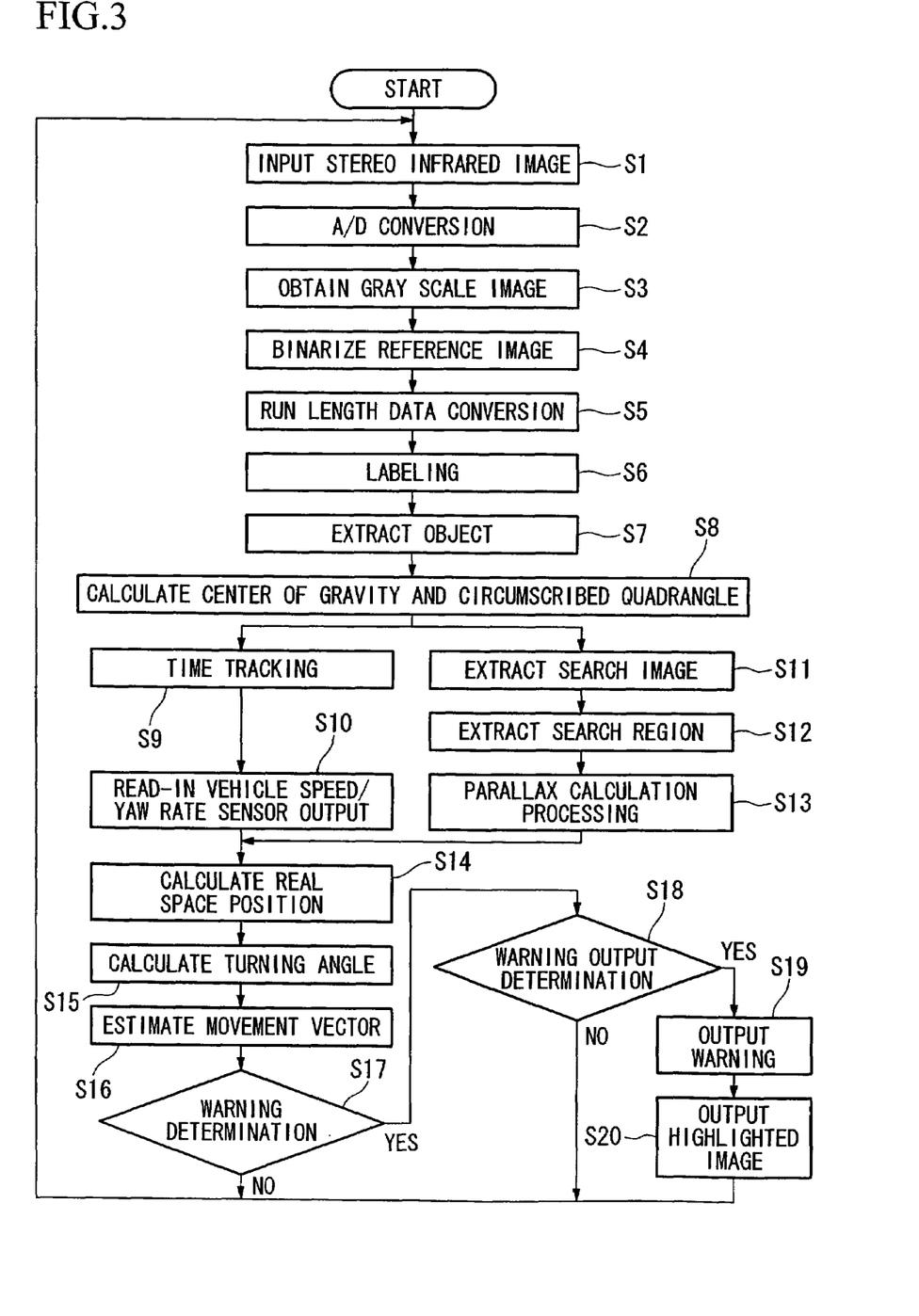
FIG. 3 is a flow chart showing the operations of the vehicle surroundings monitoring apparatus shown in FIG. 1.

First of all, in step S1 shown in FIG. 3, the image processing unit 1 obtains infrared images, which are the output signals from the infrared cameras 2R and 2L.

Next, in step S2, A/D conversion of the obtained images is performed.

Next, in step S3, a gray scale image containing half tone gradation information is obtained, and stored in an image memory. Here the infrared camera 2R acquires the right image and the infrared camera 2L acquires the left image. Furthermore, because in the right image and the left image the horizontal position on the display screen for the same object appears displaced, this displacement (that is, parallax) enables calculation of the distance from the vehicle 10 to the object.

Next in step S4, the right image obtained by the infrared camera 2R is assigned as the reference image, and binarization processing of this image signal is performed, that is, regions brighter than a predetermined luminance threshold value ITH are set to "1" (white), and darker regions are set to "0" (black).

The processing of steps S4 through S9 above is executed for the reference image obtained from the binarization processing (for example, the right image).

Next, in step S5, the image data obtained as a result of binarization processing for the infrared images is converted into run length data. In the run length data, regions that have become white as a result of the binarization processing are displayed as lines at the pixel level. Each line is set to have the width of one pixel in the y direction and the length of an appropriate number of pixels in the x direction.

Next, in step S6, labeling of the object is performed for the image data converted into the run length data.

Next, in step S7, the object is extracted according to the labeling of the object. Here, in the case where lines including equal x direction coordinates are adjacent to each other among respective lines of the run length data, the adjacent lines are recognized to be forming a single object.

Next, in step S8, the center of gravity G of the extracted object, the area S, and the aspect ratio ASPECT of the circumscribed quadrangles are calculated.

Here, the areas S are calculated by adding the lengths (run (i)−1) of each run length data for the same object, assuming that the run length data of the object labeled A is (x (i), y (i), run (i), A) (i=0, 1, 2, . . . , N−1; where N is an arbitrary nonnegative integer).

Furthermore, the coordinates (xc, yc) of the center of gravity G of the object labeled A are calculated by multiplying the length (run (i)−1) of each run length data by the coordinates x (i) or y (i) (that is, (run (i)−1)×x (i) or (run (i)−1)×y (i)), adding the multiplication products for the same object, and dividing the result by the area S.

In addition, the aspect ratio ASPECT is calculated as the ratio Dy/Dx of the length Dy in the vertical direction of a quadrangle circumscribed around the object labeled A against the length Dx in the horizontal direction.

Since the run length data is represented by the number of pixels (number of coordinates) (=run (i)), it is necessary to subtract 1 from the actual length (=run (i)−1). Furthermore, the coordinate of the center of gravity G can be substituted for the center of gravity of the circumscribed quadrangle of the object.

Next, the processing of step S9 and step S10, and the processing of step S11 to step S13 are performed in parallel.

First of all, in step S9, time tracking of the object is performed, that is, the same object is recognized in each sampling period. The time tracking is performed to determine whether two objects A and B extracted at time k, which is an analog time t discrete within a sampling period, are the same as the bodies C and D, which are extracted at the discrete time (k+1). When it is determined that the objects A and B are the same as the objects C and D, the objects C and D are relabeled as objects A and B. Then, the coordinates of each object that has been recognized (for example, the center of gravity) are stored in the memory as time series position data.

Next, in step S10, the vehicle speed VCAR detected by the vehicle speed sensor 4 and the yaw rate YR detected by the yaw rate sensor 3 are obtained, and by taking the time integral of the yaw rate YR, the turning angle θr of the vehicle 10 is calculated.

Meanwhile, in parallel to the processing in step S9 and step S10, processing for calculating the distance z between the object and the vehicle 10 is performed in step S11 through step S13. Because the processing of step S11 requires more time than that of step S9 and step S10, it is performed for a longer period than steps S9 and S10 (a period approximately three times longer than the period for steps S1 through S10, for example).

First, in step S11, one of a plurality of the objects tracked in the binarized image data of the reference image (for example, the right image) is selected, and for example, the entire region enclosing the selected object by a circumscribed quadrangle is extracted as a search image R1 from the reference image (for example, the right image).

Next, in step S12, a search region for searching an image (corresponding image) R2 corresponding to the search image R1 is set in the image (for example, the left image) that corresponds to the reference image (for example, the right image), and a correlation calculation is performed to extract a corresponding image R2. Here, for example, a search region is set in the left image according to the vertex coordinates of the search image R1, a luminance difference summation value C (a, b) which shows the degree of correlation of the search image R1 in the search region is calculated, and the region where this summation value C (a, b) is lowest is extracted as the corresponding image R2. Moreover, this correlation calculation is performed for the gray scale image, not the image data obtained from the binarization process. In the case where historical position data is available for the same object, the search region can be narrowed based on the historical position data.

Next, in step S13, the positions of the centers of gravity of both the search image R1 and the corresponding image R2, and the parallax Δd at pixel level are calculated. Furthermore, the distance between the vehicle 10 and the object that is the distance z (m), (object distance) from the infrared cameras 2R and 2L to the object, is for example calculated, based on the base length of the cameras that is the horizontal distance D (m) between center positions of the each imaging device of the infrared cameras 2R and 2L, the focus distance of the camera that is the focus distance f(m) of each lens of the infrared cameras 2R and 2L, the pixel pitch p(m/pixel), and parallax Δd (pixel), as shown in the numerical expression (1).

$$z = \frac{f \times D}{\Delta d \times p} \tag{1}$$

Moreover, in step S14, when the calculation of the turning angle θr in step S10 and the calculation of the distance z in step S13 are completed, the coordinates in the image (x, y) and the distance z are converted to real space coordinates (X, Y, Z).

Here, as shown in FIG. 2 for example, the real space coordinates (X, Y, Z) are set by appointing the center position of the mounting position of the infrared cameras 2R and 2L in front of the vehicle 10 as the origin O, and the coordinates in the image are set so that the horizontal direction is the x direction and the vertical direction the y direction, with the center of the image as the origin. Furthermore, the coordinates (xc, yc) are the coordinates that have been converted from the coordinates (x, y) in the reference image (for example, the right image) into the coordinates in a virtual image obtained by aligning the origin O of the real space and the center of the image data so that they coincide, based on the relative position relationship between the mounting position of the infrared camera 2R and the origin O of the real space.

$$\begin{bmatrix} X \\ Y \\ Z \end{bmatrix} = \begin{bmatrix} xc \times z/F \\ yc \times z/F \\ z \end{bmatrix} \tag{2}$$
$$F = \frac{f}{p}$$

Next, in step S15, a turning angle correction is performed to compensate for the displacement of the object on the image caused by turning of the vehicle 10. This turning angle correction processing is to compensate for displacement by Δx in the x direction in the range of the image data taken by the infrared cameras 2R and 2L, when the vehicle 10, for example, turns to the left by an angle of θr within a period from time k to (k+1). As shown in the numerical expression (3) for example, the compensated coordinates (Xr, Yr, Zr) obtained as a result of compensating the real space coordinates (X, Y, Z) are set as new real space coordinates (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \tag{3}$$

Next, in step S16, an approximated straight line LMV, which corresponds to the relative movement vector between the object and the vehicle 10, is calculated from N(N=approximately 10, for example) pieces of real space position data constituting time series data, having undergone turning angle correction, obtained for the same object during a predetermined monitoring period ΔT.

In this step S16, the most recent coordinates P(0)=(X (0), Y(0), Z (0)) and the coordinates P prior to sampling (prior to the predetermined period ΔT) (N−1)=(X (N−1), Y (N−1), Z (N−1)) are corrected to the positions on the approximated straight line LMV, and the corrected coordinates Pv (0)=(Xv (0), Yv (0), Zv (0)) and Pv (N−1)=(Xv (N−1), Yv (N−1), Zv (N−1)) are calculated.

This procedure obtains the relative movement vector as a vector moving from the coordinates Pv (N−1) towards Pv (0).

By obtaining a relative movement vector by calculating an approximated straight line which approximates the relative movement track of the object relative to the vehicle 10 from a plurality (for example, N) pieces of real space position data within the predetermined monitoring period ΔT, it is possible to estimate with better accuracy whether or not there is a possibility of collision between the vehicle 10 and an object, reducing the effect of position detection errors.

Next, in step S17, in the warning determination processing based on the possibility of collision between the detected object and the vehicle 10, it is determined whether or not the detected object is subject to warning.

If the result of this determination is "NO", the flow returns to step S1, and the processing of step S1 to step S17 described above is repeated.

On the other hand, if the result of this determination is "YES", the flow proceeds to step S18.

Moreover, in step S18, in the warning output determination process corresponding to whether or not the driver of the vehicle 10 is operating the brake based on the output BR of the brake sensor 5, it is determined whether or not the warning output is required.

If the determination result in step S18 is "NO", for example, in the case where a degree of acceleration Gs (positive in the deceleration direction) is greater than a predetermined threshold GTH while the driver of the vehicle 10 is operating the brake, it is determined that the collision can be avoided by the brake operation, the flow returns to step S1, and the processing of step S1 to step S18 described above is repeated.

On the other hand, if the determination result in step S18 is "YES", for example in the case where a degree of acceleration Gs (positive in the deceleration direction) is not greater than the predetermined threshold GTH while the driver of the vehicle 10 is operating the brake, or in the case where the driver of the vehicle 10 is not operating the brake, the possibility of collision is determined to be high and the flow proceeds to step S19.

The predetermined threshold value GTH is a value which corresponds to acceleration which would result in the vehicle 10 stopping after a traveling distance not greater than the distance Zv (0) between the object and the vehicle 10 in the case where the degree of acceleration Gs during the brake operation is maintained.

Then, in step S19, an audible sound warning is output, for example, through the speaker 6, or visual display warning is output, for example, through the display device 7, or tactual warning is output by generating a fastening force that is tactually perceivable to the driver with generation of a predetermined tension to the seatbelt, or by generating vibration (steering vibration), to a steering wheel for example, that is tactually perceivable to the driver.

Next, in step S20, for example, the image data obtained from the infrared camera 2R is output to the display device 7 to display the relatively approaching object as a highlighted image.

Hereunder, the warning determination processing in step S17 mentioned above is described, with reference to the attached drawings.

Figure 4:
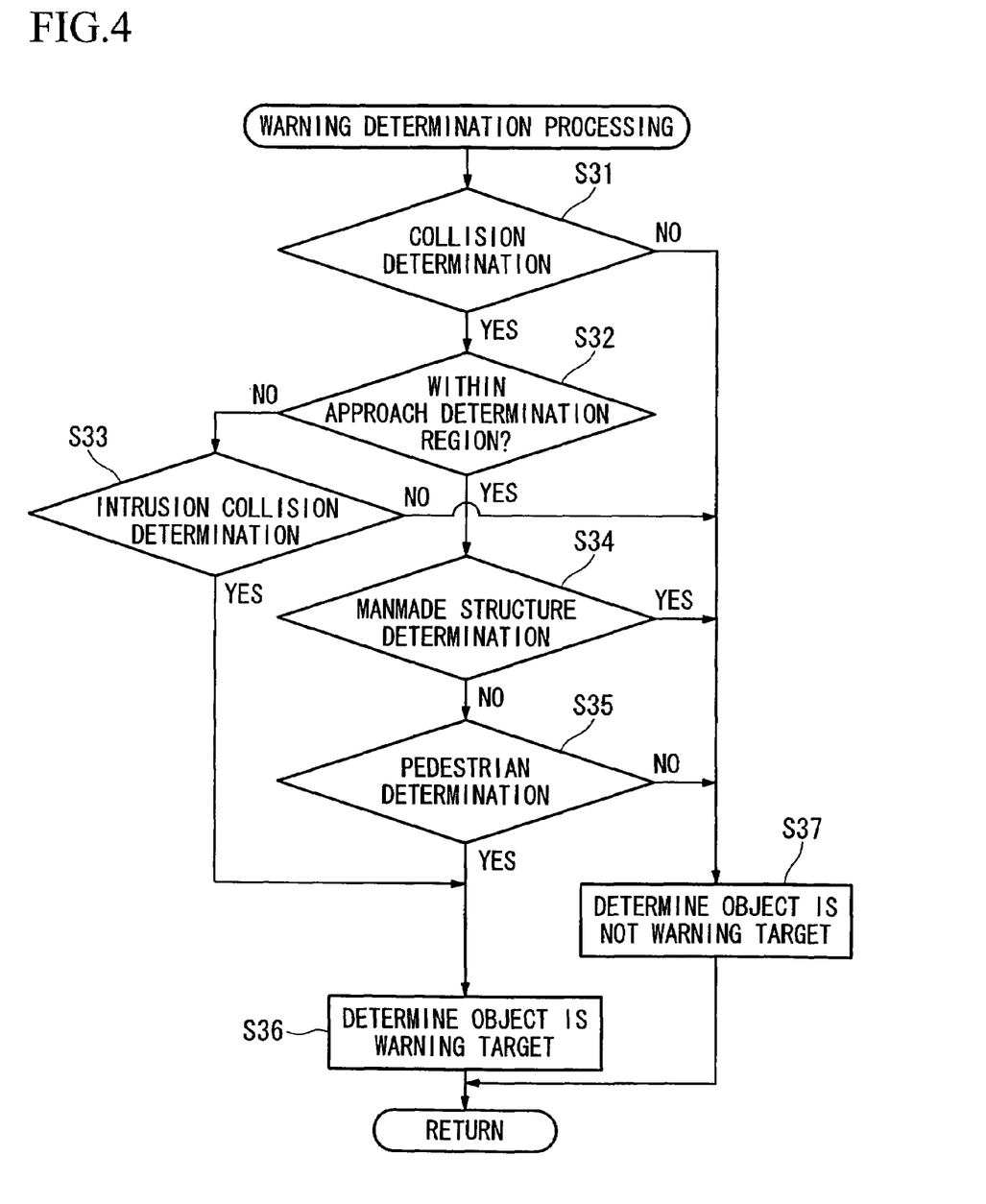
FIG. 4 is a flow chart showing the warning determination processing shown in FIG. 3.
Figure 5:
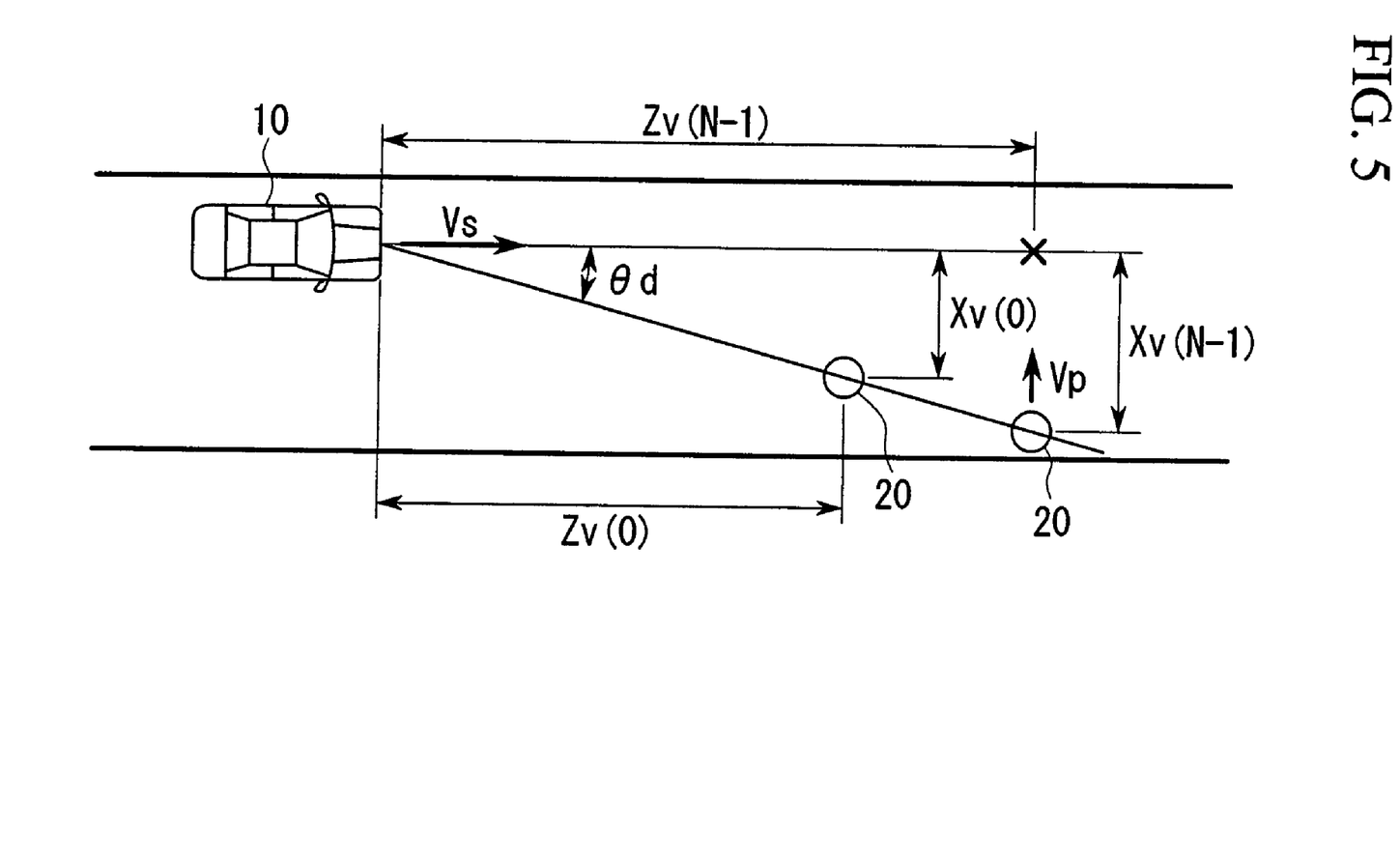
FIG. 5 is a diagram showing an example of a relative position between a vehicle and an object.

This warning determination processing determines the possibility of a collision between the vehicle 10 and a detected object based on the collision determination processing, processing to determine whether or not an object is in an approach determination region, intrusion collision determination processing, manmade structure determination processing, and pedestrian determination processing, as shown in FIG. 4. The description below makes reference to an example as shown in FIG. 5, in which an object 20 is traveling at a velocity Vp in the direction at a substantially 90° angle relative to the traveling direction of the vehicle 10 (for example the Z direction).

First of all, in step S31 shown in FIG. 4, collision determination processing is performed. This collision determination processing calculates the relative velocity Vs of the vehicle 10 and the object 20 in the Z direction in the case where, as in FIG. 5, the object 20 approaches from a distance of Zv (N−1) to a distance of Zv (0) during a time period ΔT, and assuming that the heights of both the vehicle 10 and the object 20 are not greater than a predetermined ground clearance H and the relative velocity Vs is maintained, determines whether or not the vehicle 10 and the object 20 will collide within the predetermined time allowance Ts.

If the determination result is "NO", the flow proceeds to step S37 that is described later.

On the other hand, if the result of this determination is "YES", the flow proceeds to step S32.

Also, the time allowance Ts is intended to allow determination of the possibility of a collision in advance of the estimated collision time by a predetermined length of time Ts, and is set to approximately 2 to 5 seconds, for example. Furthermore, the predetermined ground clearance H is set to approximately twice the height of the vehicle 10, for example.

Figure 6:
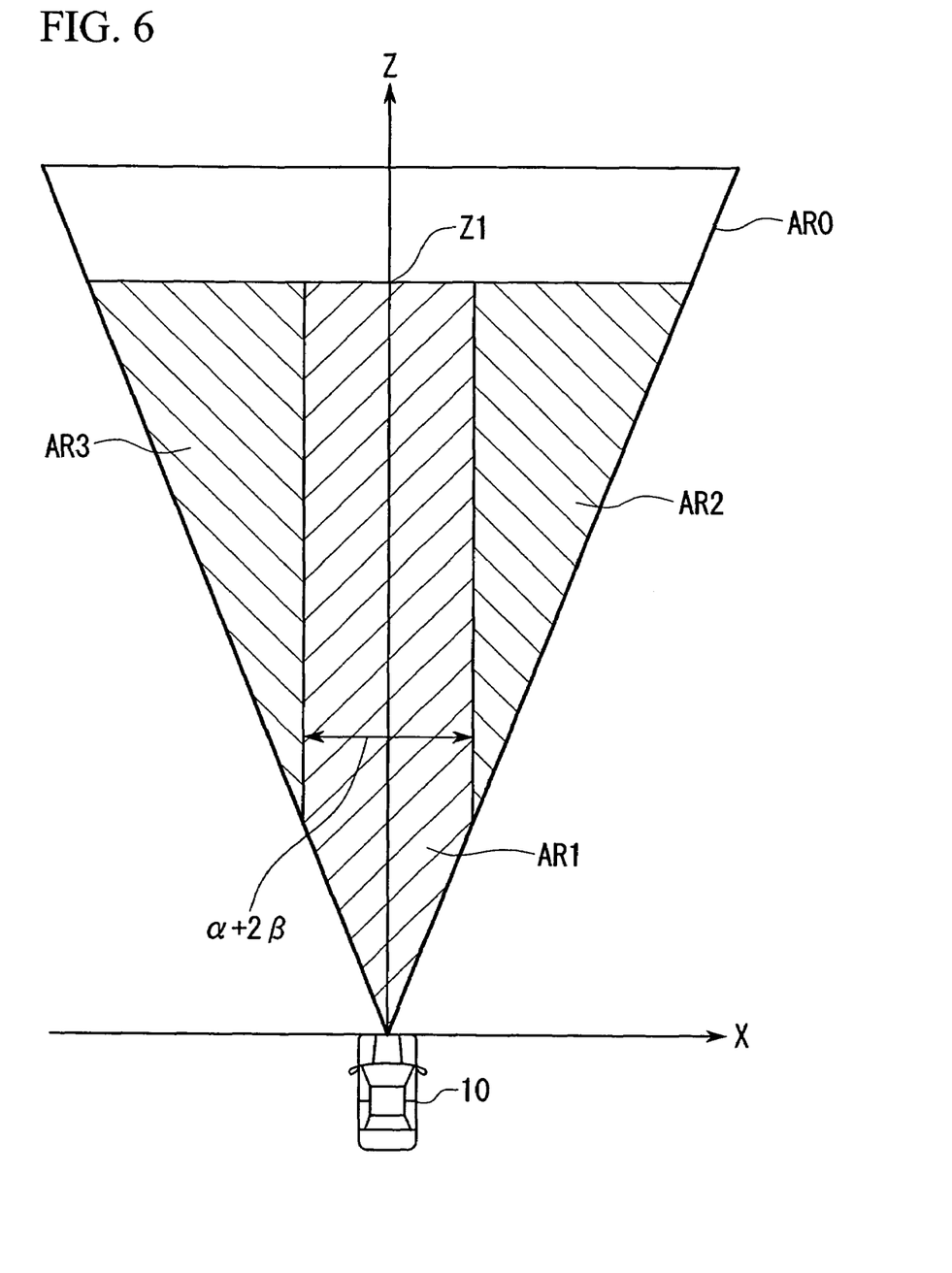
FIG. 6 is a diagram showing an example of the classification of the regions such as an approach determination region set in front of the vehicle.

Next, in step S32, whether or not the object is within an approach determination region is determined. As shown in FIG. 6 for example, in a region AR0 which can be monitored by the infrared cameras 2R and 2L, this determination processing determines whether or not the object is within a region AR1, which is a distance (Vs×Ts) closer to the vehicle 10 than a front position Z1, and which has a total width (α+2β) with predetermined width β (for example approximately 50 to 100 cm) added to both sides of the width α of the vehicle 10 in the vehicle lateral direction (that is the X direction), and which has the predetermined ground clearance H; that is, an approach determination region AR1 where there is a high likelihood of a collision occurring with the vehicle 10 if the object stays in that location.

If the determination result is "YES", the flow proceeds to step S34 that is described later.

On the other hand, if the result of this determination is "NO", the flow proceeds to step S33.

Then in step S33, intrusion collision determination processing is performed to determine whether or not there is a possibility of the object entering the approach determination region and colliding with the vehicle 10. As shown in FIG. 6 for example, this intrusion collision determination processing determines whether or not there is a possibility of the object in intrusion determination regions AR2 and AR3 at the ground clearance H, where these regions are outside the approach determination region AR1 in the vehicle lateral direction (that is, the X direction), moving and entering the approach determination region AR1 and colliding with the vehicle 10.

If the determination result is "YES", the flow proceeds to step S36, which is described later.

On the other hand, if the determination result is "NO", the flow proceeds to step S37, which is described later.

Then, in step S34, manmade structure determination processing is performed to determine whether the object is a manmade structure or not. This manmade structure determination processing determines that the object is a manmade structure and excludes the object from the warning determination if certain characteristics such as those mentioned below are detected, meaning that the object cannot be a pedestrian.

If the result of this determination is "NO", the flow proceeds to step S35.

On the other hand, if the result of this determination is "YES", the flow proceeds to step S37.

Then, in step S35, pedestrian determination processing is performed to determine whether the object is a pedestrian or not.

If the result of the determination in step S35 is "YES", the flow proceeds to step S36.

On the other hand, if the result of the determination in step S35 is "NO", the flow proceeds to step S37, which is described later.

Then, in step S36, when in step S33 there is a possibility of the object entering the approach determination region and colliding with the vehicle 10, (YES in step S33), or in step S35 the object determined possibly to be a pedestrian is not a manmade structure, (YES in step S35), it is determined that there is a possibility of the vehicle 10 colliding with the detected object and a warning is justified, and the processing is terminated.

In step S37, on the other hand, when in step S31 there is no possibility of a collision between the vehicle 10 and the object within the predetermined time allowance Ts, (NO in step S31), or in step S33 there is no possibility of the object entering the approach determination region and colliding with the vehicle 10, (NO in step S33), or in step S34 a determination is made that the object is a manmade structure, (YES in step S34), or when the object determined not to be a manmade structure in step S34 is not a pedestrian, (NO in step S35), it is determined that there is no possibility of a collision between the object and the vehicle 10 and a warning is not justified, and the processing is terminated.

Hereunder, a processing is described in which, if a plurality of the overlapping objects are recognized in the image data in the manmade structure determination processing in step S34 and the pedestrian determination processing in step S35 mentioned above, a height of the binarized object (a vertical width) is calculated.

In this manmade structure determination processing, firstly, the bottom end position of the gray scale region (that is, the region where the object exists in the gray scale image) is calculated.

Figure 7:
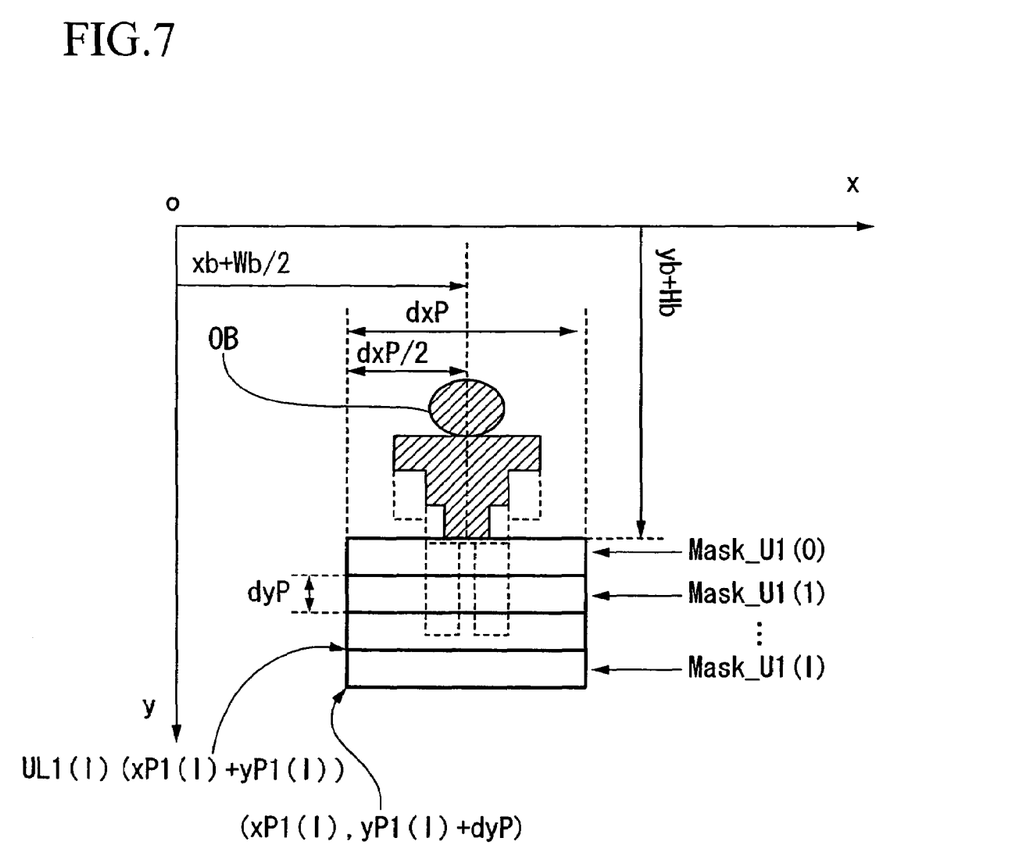
FIG. 7 shows an example of a first search region Mask_U1 (I) set when the bottom end position of the gray scale region is detected.

Firstly for example, as shown in FIG. 7, a plurality of first search regions Mask_U1 (I) (I is an appropriate positive integer) of perdetermined vertical width (height width) dyP and horizontal width dxP which are adjacent to each other downward from the bottom end of the binarized object OB are set in the reference image (for example, the right image obtained from the infrared Camera 2R).

Here, the predetermined horizontal width dxP is set to the greater value among a value of a predetermined horizontal width MASK_W of the real space (for example, a value greater than a horizontal width of a pedestrian's shoulder width, such as 70 cm) which is expanded on the image (=focus distance f×predetermined horizontal width MASK_W/ object distance z), and a predetermined value (for example, width of binarized object Wb+2× predetermined value M_W; where the predetermined value M_W is 2 pixels or the like).

Moreover, the predetermined vertical width dyP is set to the greater value among a value of a predetermined vertical width MASK_H of the real space (for example such as 10 cm) which is expanded on the image (=focus distance f×predetermined vertical width MASK_H/object distance z), and a predetermined minimum value.

Then, the parallax dn1 (I) for the respective first search regions Mask_U1 (I) disposed continually on the binarized object OB, is calculated by the correlation calculation (Sum of Absolute difference) between the right image and the left image. Based on this parallax dn1 (I) and the parallax Δd calculated in step S13 mentioned above, the first search region Mask_U1 (I) at the most bottom end position which becomes |dn1 (I)−Δd|< predetermined threshold DISP_TH, or (dn1 (I)−Δd)≧ predetermined threshold DISP_TH, is detected.

Here, if |dn1 (I)−Δd|< predetermined threshold DISP_TH, that is the parallax of the binarized object OB, and the first search region Mask_U1 (I) at the most bottom end position are approximately equal, then for example as shown in FIG. 7, by the coordinates (xP1 (I), yP1 (I)) of the left top vertex UL1(i) of this first search region Mask_U1(I), the bottom end position Ob_min_y of the gray scale region becomes Ob_min_y=yP1 (I)+dyP.

In FIG. 7, the bottom end position (yb+Hb) of the binarized object OB and the horizontal (x directional) position (xb+Wb/2) of the center of gravity of the binarized object OB are shown by the coordinates (xb, yb) of the left top vertex of the circumscribed quadrangle, the width Wb of the circumscribed quadrangle, and the height Hb of the circumscribed quadrangle of the binarized object OB.

Figure 8:
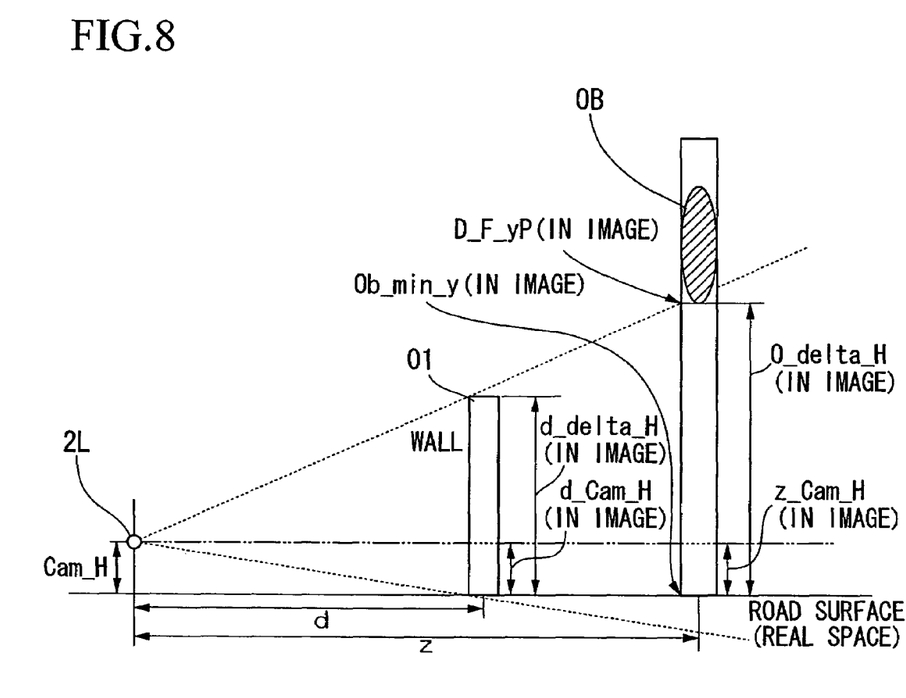
FIG. 8 shows an example in which another object O1 (for example such as a wall) is present forward of the binarized object OB, in real space.
Figure 9:
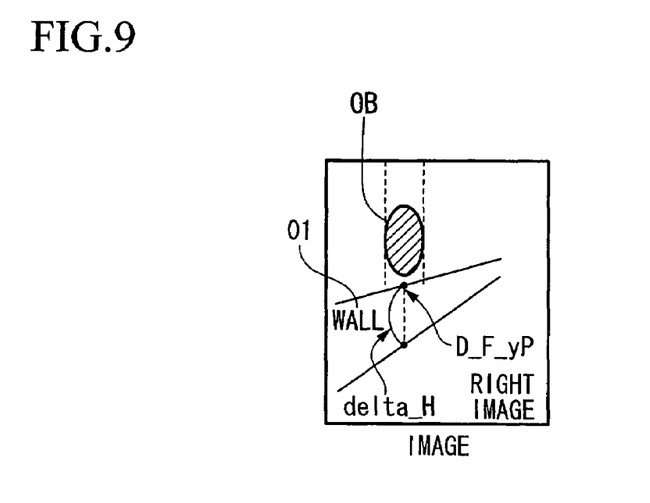
FIG. 9 shows an example in which the other object O1 (for example such as a wall) is present forward of the binarized object OB, in the image.

Moreover, if (dn1 (I)−Δd)≧ predetermined threshold DISP_TH, that is for example as shown in FIG. 8 and FIG. 9, if another object O1 (for example such as a wall) is present forward of the binarized object OB, then by the bottom end position D_F_yP of the first search region Mask_U1(K) (K is an appropriate integer) at the most bottom end position having approximately equal parallax to that of the binarized object OB, the height delta_H of the other object O1 (for example such as a wall) is set to delta_H=yP1 (I)+dyP/2−D_F_yP, and the vertical width O_delta_H of the binarized object OB shielded by the other object O1 is set to O_delta_H=(delta_H−d_d_Cam_H)+z_Cam_H, based on the ground clearance Cam_H of the infrared cameras 2R and 2L, and the distance d from the infrared cameras 2R and 2L to the other object O1. Here, d_Cam_H=f×Cam_H/d, z_Cam_H=f×Cam_H/z.

As a result, the actual height dimension (vertical width) of the binarized object OB becomes the value obtained by adding the vertical width O_delta_H to the apparent vertical width of the binarized object OB detected in the gray scale images, and the bottom end position Ob_min_y of the gray scale region becomes Ob_min_y=D_F_yP+O_delta_H.

Next, when the top end position of the gray scale region is calculated, corresponding to the case where the bottom end position is calculated, a plurality of first search regions Mask_U1 (I) (I is an appropriate positive integer) of predetermined vertical width (height width) dyP and horizontal width dxP which are adjacent to each other upward from the top end of the binarized object OB are set.

Here, the predetermined horizontal width dxP is set to the greater value among a value of a predetermined horizontal width MASK_W of the real space (for example, a value greater than a horizontal width of a pedestrian's shoulder width, such as 70 cm) which is expanded on the image (=focus distance f× ×predetermined horizontal width MASK_W/ object distance z), and a predetermined value (for example, width of binarized object Wb+2×.predetermined value M_W; where the predetermined value M_W is 2 pixels or the like).

Moreover, the predetermined vertical width dyP is set to the greater value among a value of a predetermined vertical width MASK_H of the real space (for example such as 10 cm) which is expanded on the image (=focus distance f× ×predetermined vertical width MASK_H/object distance z), and a predetermined minimum value.

Then, the parallax dn1 (I) for the respective search regions Mask_U1 (I) disposed continually on the binarized object OB, is calculated by the correlation calculation (sum of Absolute difference) between the right image and the left image. Based on this parallax dn1 (I) and the parallax Δd calculated in step S13 mentioned above, the search region Mask_U1 (I) at the most top end position which becomes |dn1 (I)−Δd|< predetermined threshold DISP_TH, is detected.

By the coordinates (xP1 (I), yp1 (I)) of the left top vertex UL1 (I) of the search region Mask_U1 (I) at this most top end position, the top end position Ob_max_y of the gray scale region becomes Ob_max_y=yP1 (I).

Accordingly, the gray scale region is set as a region having the vertical width from the top end position Ob_max_y to the bottom end position Ob_min_y and the horizontal width dxP.

As described above, according to the vehicle surroundings monitoring apparatus of the present embodiment, even in a case where, due to the presence of an obstacle (other object O1) between the infrared cameras 2R and 2L and the binarized object OB, the actual bottom end of the binarized object OB can not be directly detected so that the actual height dimension of the binarized object OB may be misdetected, the occurrence of misdetection of the actual height dimension of the binarized object Ob can be avoided by calculating the height dimension (vertical width O_delta_H) of the binarized object Ob which is shielded by the obstacle (other object O1), based on the height dimension (height delta_H) of the obstacle (other object O1) in the gray scale image. In addition, when the height of the binarized object (the vertical width) calculated by the aforementioned processes matches that of a pedestrian, the binarized object can be determined to be a pedestrian. On the other hand, when the height of the binarized object (the vertical width) calculated by the aforementioned processes does not match that of a pedestrian, the binarized object can be determined to be a manmade structure.

Figure 10:
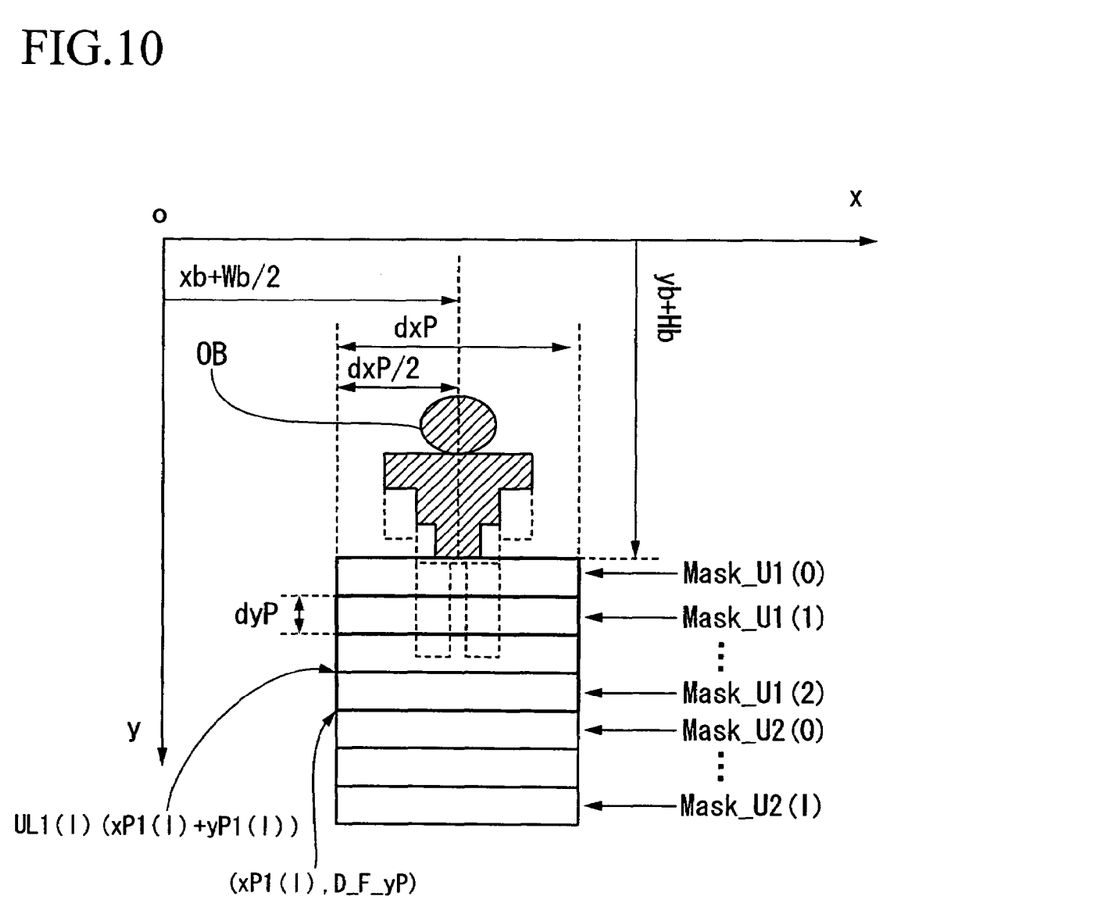
FIG. 10 shows an example of first search regions Mask_U1 (I) and second search regions Mask_U2 (I) which are set when the bottom end position of the gray scale region according to the modified example of the present invention is detected.

In the embodiment mentioned above, if another object (for example such as a wall) is present forward of the binarized object OB, the first search region Mask_U1 (I) at the most bottom end position which becomes (dn1 (I)−Δd)≧ predetermined threshold DISP_TH, is detected. However, the invention is not limited to this and may be such that, for example as shown in FIG. 10, one or a plurality of first search regions Mask_U1 (I) which become (dn1 (I)−Δd)≧ predetermined threshold DISP_TH for the respective first search regions Mask_U1 (I) (that is, it is determined that an other object O1 being an obstacle, is present between the infrared cameras 2R and 2L and the binarized object (OB), and have approximately equal parallax to each other, may be newly set as the second search region Mask_U2 (I).

In this case, whether or not the set second search regions Mask_U2 (I) are disposed continually on the binarized object OB may be determined, and a second search regions Mask_U2 (I) at the most bottom end position may be detected among one or a plurality of second search regions Mask_U2 (I) having approximately equal parallax to each other and disposed continually on the binarized object OB, and the bottom end position Ob_min_y of the gray scale region may be calculated based on the bottom end position D_F_yP of the first search region Mask_U (I) at the most bottom end position having approximately equal parallax to that of the binarized object OB, and disposed continually on the binarized object OB, and the bottom end position of the second search region Mask_U2 (I) at the most bottom end position.

Furthermore, in this case, when it is determined whether or not the second search regions Mask_U2 (I) are disposed continually on the binarized object OB, the second search regions Mask_U2 (I+j) (j is an arbitrary integer) which are present within a predetermined distance from the second search region Mask_U2 (I) having approximately equal parallax to each other may be determined as continuous to the second search region Mask_U2 (I).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle surroundings monitoring apparatus that extracts a body present in the surroundings of a vehicle as an object, based on an image captured by an infrared imaging device, comprising:
   a binarized object extraction device that extracts a binarized object from image data obtained by binarizing a gray scale image of said image;
   an obstacle determination device that determines whether or not another body being an obstacle is present between said infrared imaging device and said binarized object extracted by said binarized object extraction device;
   a height calculation device that calculates a height dimension of said binarized object based on the height dimension of said obstacle on said gray scale image when it is determined that an obstacle is present in a determination result of said obstacle determination device; and
   an object type determination device that determines a type of said object based on the height dimension of said binarized object calculated by said height calculation device.

2. A vehicle surroundings monitoring apparatus that extracts a body present in the surroundings of a vehicle as an object, based on an image captured by an infrared imaging device, comprising:
   a binarized object extraction device that extracts a binarized object from image data obtained by binarizing a gray scale image of said image;
   a first search region setting device that sets a plurality of first search regions having a predetermined height width downward of said binarized object extracted by said binarized object extraction device, and adjacent to each other, in said gray scale image;
   a second search region setting device that compares a binarized object distance which is a status quantity in relation to a distance between said binarized object extracted by said binarized object extraction device and said infrared imaging device, with a first search region distance which is a status quantity in relation to a distance between said respective plurality of first search regions set by said first search region setting device and said infrared imaging device, and newly sets said first search region corresponding to said first search region distance which is shorter than said binarized object distance, as a second search region;
   a continuity determination device that determines whether or not said second search regions set by said second search region setting device are disposed continually on said binarized object;
   a height calculation device that sets a value obtained by adding a height corresponding to a distance from the bottom end of said binarized object extracted by said binarized object extraction device to the bottom end of said second search region which is positioned at the most bottom among said second search regions determined to be disposed continually on said binarized object by said continuity determination device, to a vertical width of said binarized object, as a height dimension of said binarized object; and
   an object type determination device that determines a type of said object based on the height dimension of said binarized object calculated by said height calculation device.

3. A vehicle surroundings monitoring apparatus according to claim 2, wherein said continuity determination device determines that said binarized object or said second search regions which are present within a predetermined distance from appropriate second search regions are continually disposed second search regions.

4. A vehicle surroundings monitoring apparatus according to claim 1, further comprising:
   a pedestrian recognition device that recognizes pedestrians present in the surroundings of a vehicle based on said image,
   said pedestrian recognition device executing pedestrian recognition processing on said object when said object is determined by said object type determination device to be something other than a manmade structure, or to be a pedestrian.

5. A vehicle surroundings monitoring apparatus according to claim 1, further comprising: a warning output device that outputs a warning directed to said object when said object is determined by said object type determination device to be something other than a manmade structure or to be a pedestrian.

* * * * *